(12) United States Patent
Turner et al.

(10) Patent No.: US 6,553,286 B2
(45) Date of Patent: Apr. 22, 2003

(54) SPACECRAFT CONSTELLATION FORMATION KEEPING USING INTER-SPACECRAFT DISTANCE MEASUREMENT

(75) Inventors: Andrew E. Turner, Mt. View, CA (US); John L. Watkins, Sunnyvale, CA (US); Cornelius J. Westerhoff, San Francisco, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/931,205

(22) Filed: Aug. 16, 2001

(65) Prior Publication Data

US 2003/0036826 A1 Feb. 20, 2003

(51) Int. Cl.⁷ .................................................. B64G 1/24
(52) U.S. Cl. ...................... 701/13; 701/226; 244/158 R; 244/164
(58) Field of Search ........................... 701/13, 226, 213; 244/158 R, 164

(56) References Cited

U.S. PATENT DOCUMENTS

| | | | |
|---|---|---|---|
| 4,912,475 A | * 3/1990 | Counselman, III | .......... 701/226 |
| 5,267,167 A | * 11/1993 | Glickman | .................. 244/164 |
| 5,323,322 A | * 6/1994 | Mueller et al. | ............. 701/226 |
| 6,089,507 A | * 7/2000 | Parvez et al. | ........... 244/158 R |
| 6,341,249 B1 | * 1/2002 | Xing et al. | .................... 701/13 |

OTHER PUBLICATIONS

AIAA, Paper AAS 01–339; Trajectory Estimation for Satellite Clusters; Ralph E. Bordner and William E. Wiesel; Jul. 30, 2001–Aug. 2, 2001; 14 pages inc. cover pg.

AIAA, Paper AAS 01–479; Autonomous Orbital Rendezvous Using Angles–Only Navigation; R.J. Chari, D.K. Geller, H.L. Norris, C.N. D'Souza, T.J. Brand; Jul. 30, 2001–Aug. 2, 2001; 22 pages inc. cover pg.

AIAA, Paper AAS 01–476; Relative Motion Estimation for Clustered Geostationary . . . ;S. Carlini, C. Pastor; Jul. 30, 2001–Aug. 2, 2001; 14 pages inc. cover pg.

\* cited by examiner

*Primary Examiner*—Gary Chin
(74) *Attorney, Agent, or Firm*—Perman & Green, LLP (57) ABSTRACT

A method for controlling a spacecraft comprising the steps of providing a first spacecraft in a known first predetermined orbit, and a second spacecraft in a second predetermined orbit. The distance between the first and second spacecraft is measured. The measured distance and data describing the known first predetermined orbit are used for determining an orbital error bias of the second spacecraft relative to the second predetermined orbit. The second spacecraft is maneuvered to compensate for the orbital error bias, and to maintain the second spacecraft in the second predetermined orbit.

22 Claims, 10 Drawing Sheets

SPACECRAFT CONSTELLATION FORMATION KEEPING USING INTER-SPACECRAFT DISTANCE MEASUREMENT

BACKGROUND OF THE INVENTION

1. Field of the Invention

The present invention relates to spacecraft operation and, more particularly, to controlling the formation of a constellation of spacecraft.

2. Prior Art

Worldwide satellite communication systems, such as for example Globalstar™, and Iridium™, employ a large constellation of communication spacecraft or satellites. For example, Globalstar™ generally uses a constellation of about 48 spacecraft in low earth orbit (LEO). The Iridium™ constellation has 66 spacecraft. The Global Positioning System (GPS) also employs a constellation of spacecraft to provide positioning services. To provide the commercially desirable levels of coverage, the satellites within these and other constellations of spacecraft are maintained in a predetermined constellation formation. Conventional methods of formation keeping in a constellation of spacecraft have generally relied on one of two approaches or a combination of these approaches. In the first conventional approach to maintain constellation formation, each of the spacecraft in the spacecraft constellation has GPS receivers. The GPS receivers aboard each spacecraft provide high precision orbital data for each spacecraft. This orbital data for each spacecraft may be transmitted (i.e. downlinked) to a ground based processing facility (e.g. ground control station) which determines the high precision orbit solution for each spacecraft in the constellation. The ground based processing facility examines the orbit solution of each spacecraft and commands maneuvers for each spacecraft to maintain constellation formation in response to observed or anticipated orbit deviations or bias of each spacecraft. The other conventional approach for maintaining constellation formation determines the orbit solution for each spacecraft in the constellation using ground based measurements (e.g. tracking using ground antennas that obtain spacecraft position information relative to the ground antennas locations). The ground based measurements for each spacecraft are again sent to a ground based processing facility which examines the orbit solution for each spacecraft, and sends maneuver commands to each spacecraft to maintain the constellation formation. Globalstar™ uses on board GPS navigation equipment carried by each spacecraft in the constellation. Data gathered by this equipment is downlinked to a ground facility for processing. A ground based approach for constellation formation keeping is used by the Iridium™ and GPS systems. Both conventional approaches treat constellation formation keeping substantially the same as maintaining the orbit of an individual spacecraft for each of the spacecraft in the constellation. Accordingly, both conventional approaches for constellation formation keeping are inefficient, and costly. This is due to the duplication in the equipment (e.g. GPS receivers on all spacecraft, or extensive number of ground based tracking stations) used to identify the orbit solutions for each spacecraft, and of the processing cost for substantially simultaneously examining the orbit solutions of all spacecraft in the constellation. The present invention overcomes the problems of the prior art as will be described in greater detail below.

SUMMARY OF THE INVENTION

In accordance with a first method of the present invention, a method for controlling a spacecraft is provided. The method comprises the steps of providing a first spacecraft in a known predetermined orbit, and a second spacecraft in a second predetermined orbit, measuring a distance between the spacecraft, using the measured distance for determining an orbital error bias, and maneuvering one of the spacecraft to compensate for the orbital error bias. The measured distance is used for determining the orbital error bias of the second spacecraft relative to the second predetermined orbit. The second spacecraft is maneuvered to compensate for its orbital error bias and to maintain the second spacecraft in the second predetermined orbit.

In accordance with a second method of the present invention, a method for controlling a spacecraft constellation is provided. The method comprises the steps of providing a first spacecraft of the spacecraft constellation in a first predetermined orbit, a second spacecraft of the spacecraft constellation in a second predetermined orbit, and a third spacecraft of the spacecraft constellation in a third predetermined orbit. A first distance is measured between the second spacecraft and the first spacecraft. A second distance is measured between the third spacecraft and the second spacecraft. The first measured distance is used for determining an orbital error bias of the second spacecraft relative to the second predetermined orbit. The second measured distance and orbital error bias of the second spacecraft are used for determining a orbital error bias of the third spacecraft relative to the third predetermined orbit. When resources are available, the second spacecraft is maneuvered to compensate for its orbital error bias and to maintain the second spacecraft in the second predetermined orbit. The third spacecraft is maneuvered to compensate for its orbital error bias and to maintain the third spacecraft in the third predetermined orbit.

In accordance with a first embodiment of the present invention, a spacecraft is provided. The spacecraft comprises a spacecraft bus, a range finder, and a controller. The spacecraft bus has a maneuvering system mounted thereon. The range finder is connected to the spacecraft bus for measuring a distance between the spacecraft and another spacecraft. The controller is connected to the spacecraft bus. The controller is communicably connected to the range finder for receiving the distance measurement from the range finder. The controller is programmed for determining an orbital error bias of the spacecraft from the distance measurement. The controller is further programmed for operating the maneuvering system in response to the determined orbital error bias.

In accordance with a second embodiment of the present invention, a constellation of spacecraft is provided. The constellation of spacecraft comprises a first spacecraft, and a second spacecraft. The first spacecraft is in a first predetermined orbit. The second spacecraft is in a second predetermined orbit. The second spacecraft orbits generally in formation with the first spacecraft in the first orbit. The second spacecraft has a range finder for measuring a distance between the second spacecraft and the first spacecraft. The second spacecraft has a controller communicably connected to the range finder for receiving the measured distance from the range finder. The controller has programming for determining an orbital error bias of the second spacecraft from the measured distance. The controller includes programming for operating a maneuvering system of the second spacecraft in response to the determined orbital error bias for maintaining the second spacecraft in the second predetermined orbit generally in formation with the first spacecraft in the first predetermined orbit.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
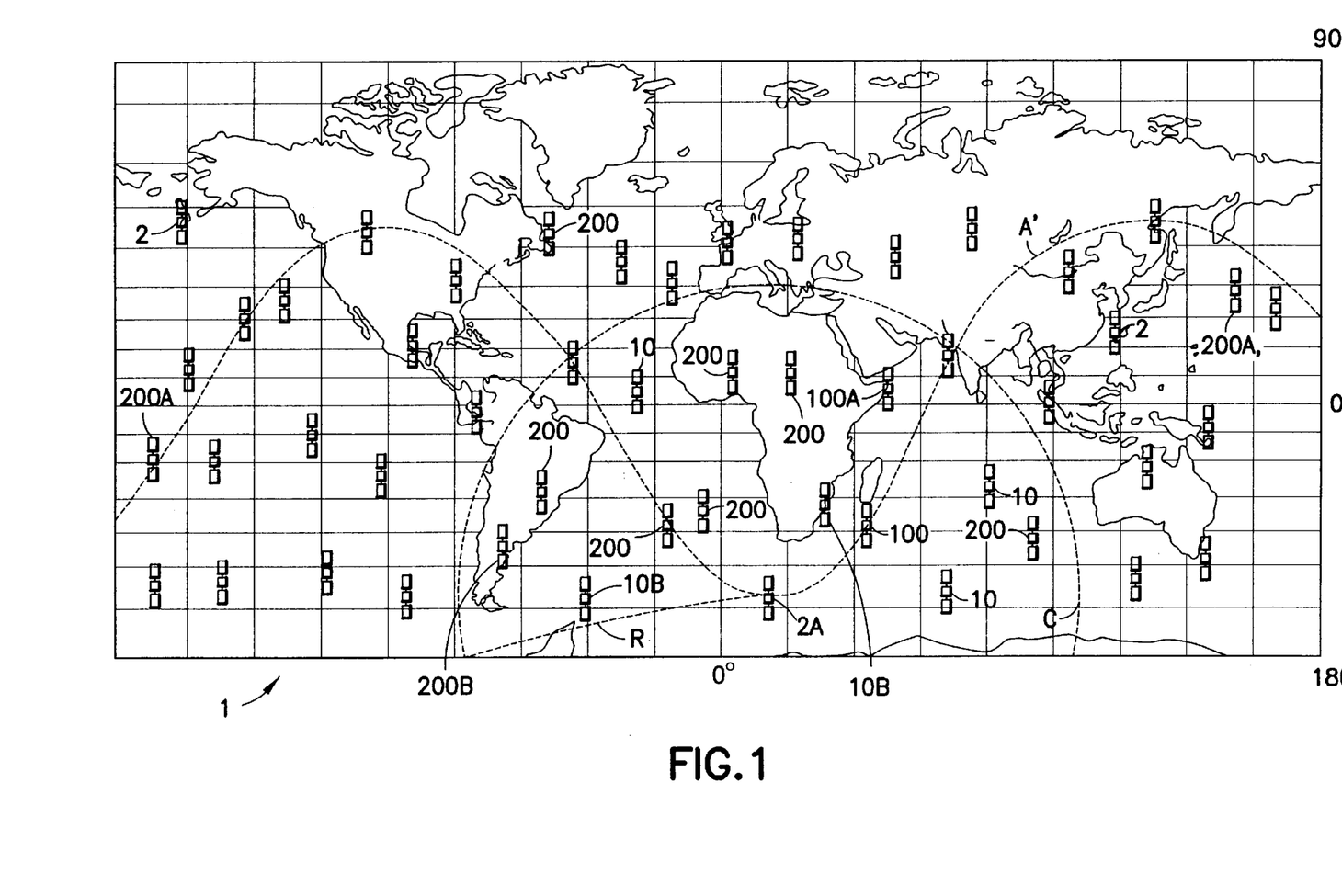
FIG. 1 is a plan view showing the positions of a constellation of orbiting spacecraft superposed over the surface of the earth.

Referring to FIG. 1, there is shown a perspective view of a constellation of spacecraft 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

Figure 1A:
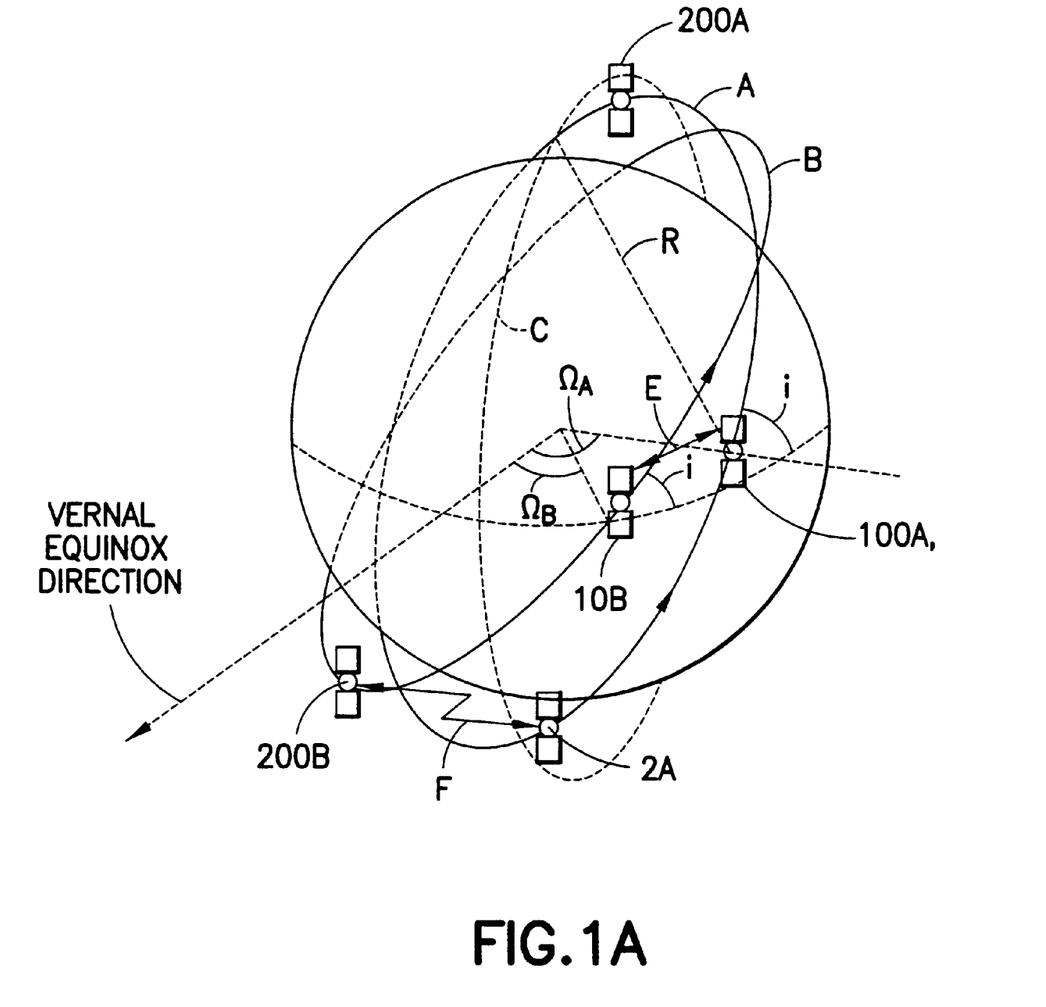
FIG. 1A is a perspective view showing sample orbits of a number of the primary, secondary, and tertiary spacecraft from the constellation of spacecraft in FIG. 1.

Referring also to FIG. 1A, the constellation of spacecraft generally includes a number of master or primary spacecraft 21, 2A, secondary spacecraft 10, 10B, and tertiary spacecraft 100, 100A, 200, 200B. The spacecraft 2, 2A, 10, 10B, 100, 100A, 200, 200B in the constellation 1 are generally equally distributed in substantially similar orbits in a number of different orbital planes. The spacecraft which make up the constellation 1 are maintained in a given constellation formation as they orbit around the earth. FIG. 1 shows an example of the formation of the spacecraft in constellation 1 superposed over the surface of the Earth at a given point in time. FIG. 1 further shows an example of an approximate ground track A' for spacecraft 2A. Spacecraft 100A, 200A orbit the Earth in substantially the same orbital plane as spacecraft 2A, but follow different ground tracks therefore, 100A and 200A do not lie on ground track A'. FIG. 1A, is a perspective view which shows orbit A, of spacecraft 2A, 10A, 200A which are in the same orbit plane. FIG. 1A also shows orbit B of spacecraft 10B, 200B of the constellation of spacecraft in FIG. 1, which are in an adjacent orbit plane to spacecraft 2A, 100A in orbit A. Spacecraft 2A, in orbit A is a master spacecraft of the constellation 1. The master spacecraft 2A along with the other master spacecraft 2 in constellation 1 may have GPS receivers used to generate high precision orbit solutions for the master spacecraft 2, 2A in the constellation. The secondary spacecraft 10, 10B are capable of determining high precision orbital solutions, and hence, any bias in orbit parameters using inter-spacecraft range measurements (ISRM) between the secondary spacecraft 10, 10B, and the master spacecraft 2, 2A. The tertiary spacecraft 100, 10A, 200, 200B are capable of determining high precision orbital solutions using the ISRM to the secondary spacecraft 10, 10B. The tertiary spacecraft 100A in the same orbital plane as a master spacecraft 2A, may further be capable of establishing at least a partial orbital solution (i.e. bias in some but not all of the parameters defining the spacecraft's orbit using the ISRM to the master spacecraft 2A.) Hence, in accordance with the present invention, the formation of the secondary and tertiary spacecraft 10-10B, 100-100A, 200-200B in constellation 1 is maintained using the ISRM to the master spacecraft 2, 2A in the constellation, and for the tertiary spacecraft 100-100A, 200-200B further by using the ISRM to the secondary spacecraft 10, 10B as will be described in greater detail below.

Still referring to FIGS. 1, 1A, in the preferred embodiment the constellation of spacecraft 1 is a Walker constellation with 48 spacecraft 2-2A, 10-10B, 100-100A, 200-200B in the constellation. A similar constellation of spacecraft is used for example for the Globalstar™ satellite communication system. The 48 spacecraft and the Walker constellation 1 are distributed in eight orbital planes. FIG. 1A shows orbits A, B of spacecraft 200A, 100A, 10B, 200B orbiting in two adjacent orbital planes from the eight planes in the constellation, for example purposes. As noted before, the ground track A' for the spacecraft 2A, A5, in orbit A is shown in FIG. 1. There are six spacecraft as, equally distributed in each orbit plane (FIG. 1A shows two spacecraft 2A, 100A, 10B, 200B as, in each orbit plane for example purposes). In alternate embodiments, the spacecraft constellation may have any suitable number of spacecraft, distributed in any suitable number of orbit planes, with any desired number of spacecraft orbiting in each plane. The spacecraft in Walker constellation 1 are preferably in low earth orbit (LEO). The spacecraft orbit, such as for example orbits A, B in FIG. 1A, are substantially circular (i.e. orbit eccentricity $e \doteq 0$). Although the present invention will be described below with particular reference to the constellation 1 of circular LEO spacecraft, the present invention applies equally to a constellation 612 spacecraft in medium earth orbit (MEO), or geosynchronous orbit (GEO), having any suitable orbit eccentricity ($0 \leq e < 1$). The orbit altitude for the spacecraft in constellation 1 may be, for example, about 1414 km, similar to the altitude of the communication spacecraft in the Globalstar™ system. The spacecraft orbits in the eight orbital planes of the constellation 1 are preferably pro-grade orbits with an inclination i of about 52° (see, for example, orbits A, B in FIG. 1A). The orbit planes are equally distributed about the circumference of the Earth, such that the right ascension of the ascending node (RAAN) $\Omega$ of orbits in adjacent planes ($\Omega_A - \Omega_B$) are separated approximately by about 22.5° for example. In alternate embodiments, the spacecraft orbits may be Molniya, polar, equatorial, geo-synchronous as pro-grade, or retrograde, with any suitable inclination, and the RAAN of the orbit in the various orbit planes of the constellation may be set as desired. Each spacecraft in the constellation 1 completes an orbit once approximately every 114 minutes.

As noted previously, the spacecraft constellation 1 comprises master spacecraft 2-2A, secondary spacecraft 10-10B, and tertiary spacecraft 100-100A, 200-200B. As will be described below, the master spacecraft 2-2A are provided with means for generating independent high precision orbit solutions. The secondary spacecraft 10-10B have onboard means for establishing high precision orbit solutions (i.e. identifying any orbit bias) based on measurements relative to the master spacecraft 2-2A. The tertiary spacecraft may include both first order tertiary spacecraft 100-100A which have onboard means for establishing high precision orbit solutions based on measurements relative to secondary spacecraft 10-10B, and second order tertiary spacecraft 200-200B with onboard means for establishing high precision orbit solutions based on measurements relative to first order tertiary spacecraft 100-100A. In the preferred embodiment, the spacecraft constellation 1 comprises at least three master spacecraft 2-2A. Each master spacecraft 2-2A is located in a corresponding one of the eight orbit planes in constellation 1 such that a corresponding third of the secondary spacecraft 10-10B are within a zone C about each of the master spacecraft 2-2A. The spacecraft in zone C are in continuous line of sight with the master spacecraft 2-2A of constellation 1 (see FIG. 1A). Hence, three of the eight orbit planes have a master spacecraft 2, 2A with preferably at least one master spacecraft being located in each hemisphere. In alternate embodiments, the spacecraft constellation 1 may include any suitable number of master spacecraft. The orbits of the secondary spacecraft 10-10B are preferably in different orbital planes than the orbits of the corresponding master spacecraft 2-2A which remains continuously within line-of-sight of the corresponding secondary spacecraft. For example, FIG. 1A shows the orbit B of a secondary spacecraft 10B in an adjacent orbit plane to orbit A of master spacecraft 2A. Other secondary spacecraft 10 of constellation 1 may however orbit in other orbital planes (not shown) which are not adjacent to the orbit plane of the corresponding master spacecraft 2. The RAAN$\Omega_B$ of orbit B shown in FIG. 1A is smaller than the RAAN$\Omega_A$ of orbit A. Secondary spacecraft (not shown) may also have orbits with a RAAN which is greater than the RAAN$\Omega_A$ of orbit A of the corresponding master spacecraft. FIG. 1A shows one secondary spacecraft 10B in orbit B for simplicity. The number of secondary spacecraft 10 of constellation 1 in each orbit plane around a corresponding master spacecraft 2, however, is limited by the size of the continuous line-of-sight zone C (i.e. location of the local horizon) which is dependent on the orbital altitude and the type of orbit of the spacecraft. By way of example, in the case where the orbital altitude is about 1414 km, the radius R of line-of-sight zone C about master spacecraft 2A is about 8,700 km in the case the minimum height for the cross link is about 100 km (see FIG. 1). The line-of-sight zone C moves with the master spacecraft 2A. FIG. 1 shows both secondary and tertiary spacecraft 10-10B, 100-100A, 200-200B within the line-of-sight zone C of the master spacecraft at a given point in time, but only secondary spacecraft 10-10B may remain continuously within line-of-sight as the master spacecraft 2A complete its orbit. There may be about four spacecraft which may remain in continuous line of sight. As can be envisioned from FIGS. 1, 1A, orbital planes proximate to the master spacecraft 2A have a larger number of secondary spacecraft 10 as, than orbital planes further from the master spacecraft 2A. In FIG. 1A, the master spacecraft 2A is shown for example leading (i.e. argument of latitude (ARGL), or position from ascending node of the master spacecraft 2A is greater than) the secondary spacecraft 10B. The master spacecraft 2-2A may also trail a secondary spacecraft 10 in the corresponding continuous line-of-sight zone (see also FIG. 1). The tertiary spacecraft 200-200B have orbits which do not provide continuous line-of-sight with at least one master spacecraft 2-2A of the constellation 1. Tertiary spacecraft 100-100A have orbits which maintain continuous line-of-sight with at least one master spacecraft 2-2A, but are in the same orbital plane as the master spacecraft within line-of-sight. The orbits of the tertiary spacecraft 100, 100A provide the spacecraft with continuous line-of-sight to at least one of the secondary spacecraft 10-10B in constellation 1, or in the case of second order tertiary spacecraft 200, 200B with continuous line-of-sight to a first order tertiary spacecraft 100, 100A. By way of example, as shown in FIG. 1A, spacecraft 100A in orbit A is a first order tertiary spacecraft with continuous line-of-sight (indicated by arrow E) to secondary spacecraft 10B. Spacecraft 200B in orbit B is a second order tertiary spacecraft with continuous line-of-sight (indicated by arrow F) to first order tertiary spacecraft 100A in orbit A. Similar to the above noted position relationship between master and secondary spacecraft, the tertiary spacecraft 100-100A are preferably in a different orbital plane than the corresponding secondary spacecraft 10, 10B which are within continuous line-of-sight. Similarly, the second order tertiary spacecraft 200-200B are in a different orbital plane than their corresponding first order tertiary spacecraft 100-100A. The secondary spacecraft 10, 10B in continuous line-of-sight of first order tertiary spacecraft 100-100A are the benchmark spacecraft for the first order tertiary spacecraft. The first order tertiary spacecraft 100-100A within continuous line-of-sight of corresponding second order tertiary spacecraft 200-200B are the benchmark spacecraft for the second order tertiary spacecraft. The first order tertiary spacecraft 100-100A may have orbits with RAAN smaller or greater than the corresponding benchmark spacecraft. The second order tertiary spacecraft 200-200B may have orbits with RAAN smaller or greater than their corresponding benchmark spacecraft. Some of the dependent spacecraft may be leading, or following the corresponding benchmark spacecraft. In FIG. 1A, for example, the dependent spacecraft 10A, 200B respectively follow the corresponding benchmark spacecraft 10B, 100A.

Figure 2:
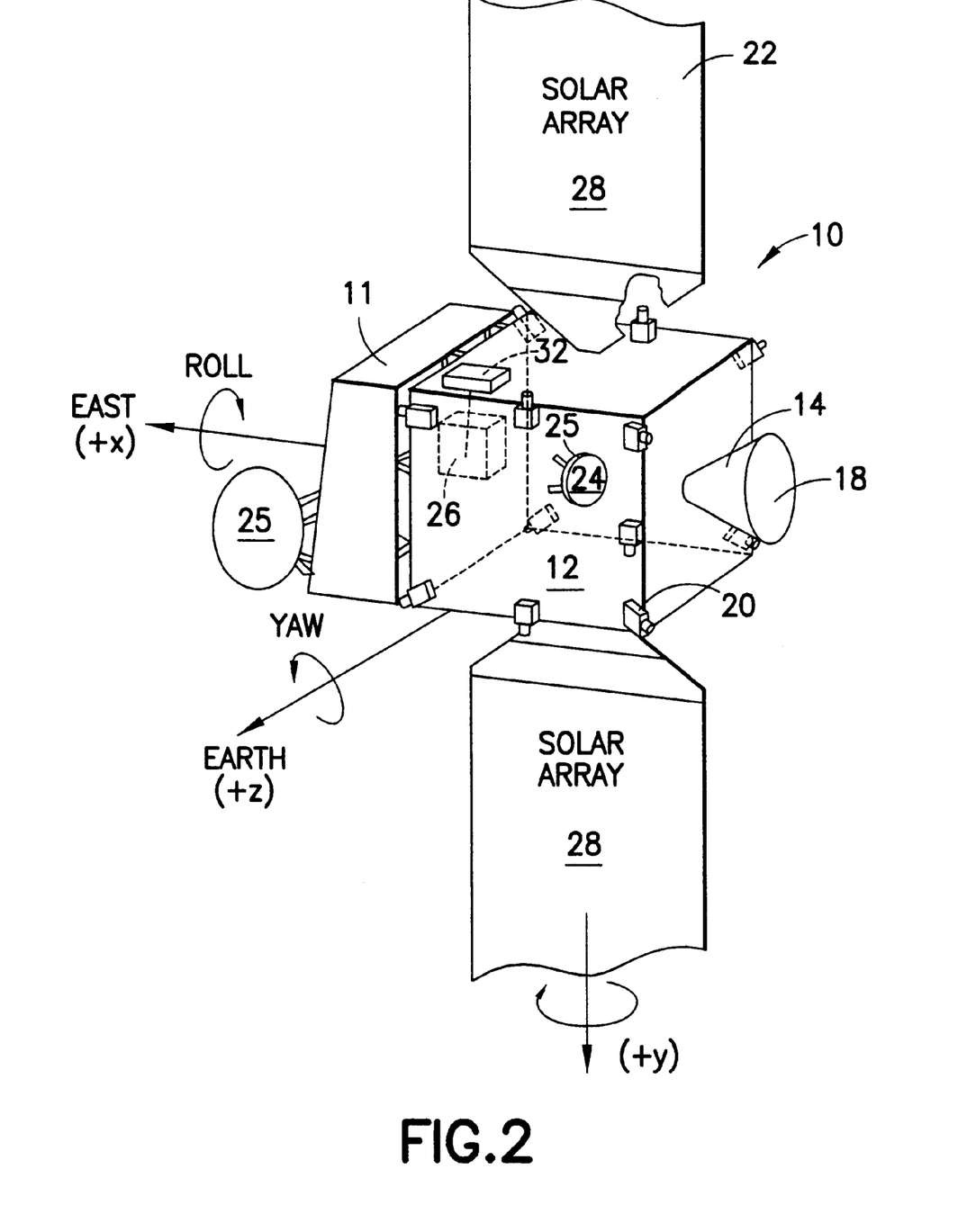
FIG. 2 is a perspective view of a secondary spacecraft from the constellation of spacecraft in FIG. 1.

Referring now to FIG. 2, the master, secondary, first order tertiary, and second order tertiary spacecraft 22A, 10-10B, 100-100A, 200-200B, in constellation 1 are substantially similar except as otherwise noted below. FIG. 2 shows a perspective view of a secondary spacecraft 10. The spacecraft 10 generally comprises a bus 12, a payload pallet or deck 11, a maneuvering system 14, an electrical power system 22, and a controller 26. The payload deck 11 is supported from the bus 12. The payload deck 11 holds the spacecraft payload 25 which in the case of a communications spacecraft, for example, such as the Globalstar™ spacecraft, is a communication payload capable of bi-directional communication with ground stations or user terminals (not shown). The maneuvering system 14 is mounted onto the bus 12. The maneuvering system 14 may include a plurality of thrusters 18, 20 used for attitude control and orbit corrections, and one or more momentum wheels, magnetic torquers, gravity stabilization means, or any other suitable means (not shown) for providing three axes (X, Y, Z) stabilization and attitude control of the spacecraft 10. Power to the payload deck 11, bus 12, and maneuvering system 14 is provided from the electrical power system 22. The electrical power system 22 includes solar arrays 28, preferably in combination with batteries (not shown) mounted on the bus. Operation of the maneuvering system 14, and electrical power system 22 is controlled by controller 26 within the bus 12. The spacecraft 10 further includes a communication system 24. The communication system 24 is connected to the controller 26 and allows bi-directional communication between the controller 26 and other spacecraft in constellation 1, or ground stations (not shown). The communication system includes directional, and omni-directional antennas (only one directional antenna 25 is shown in FIG. 2 for example purposes) which are connected by appropriate transceivers, and modulators/ demodulators (not shown) to controller 26. By way of example, the controller 26 may thus transmit spacecraft ephemeris data to the ground stations and other spacecraft in constellation 1. The controller 26 may in turn receive program updates from grounds stations for performing maneuvers or house keeping functions.

Figure 3:
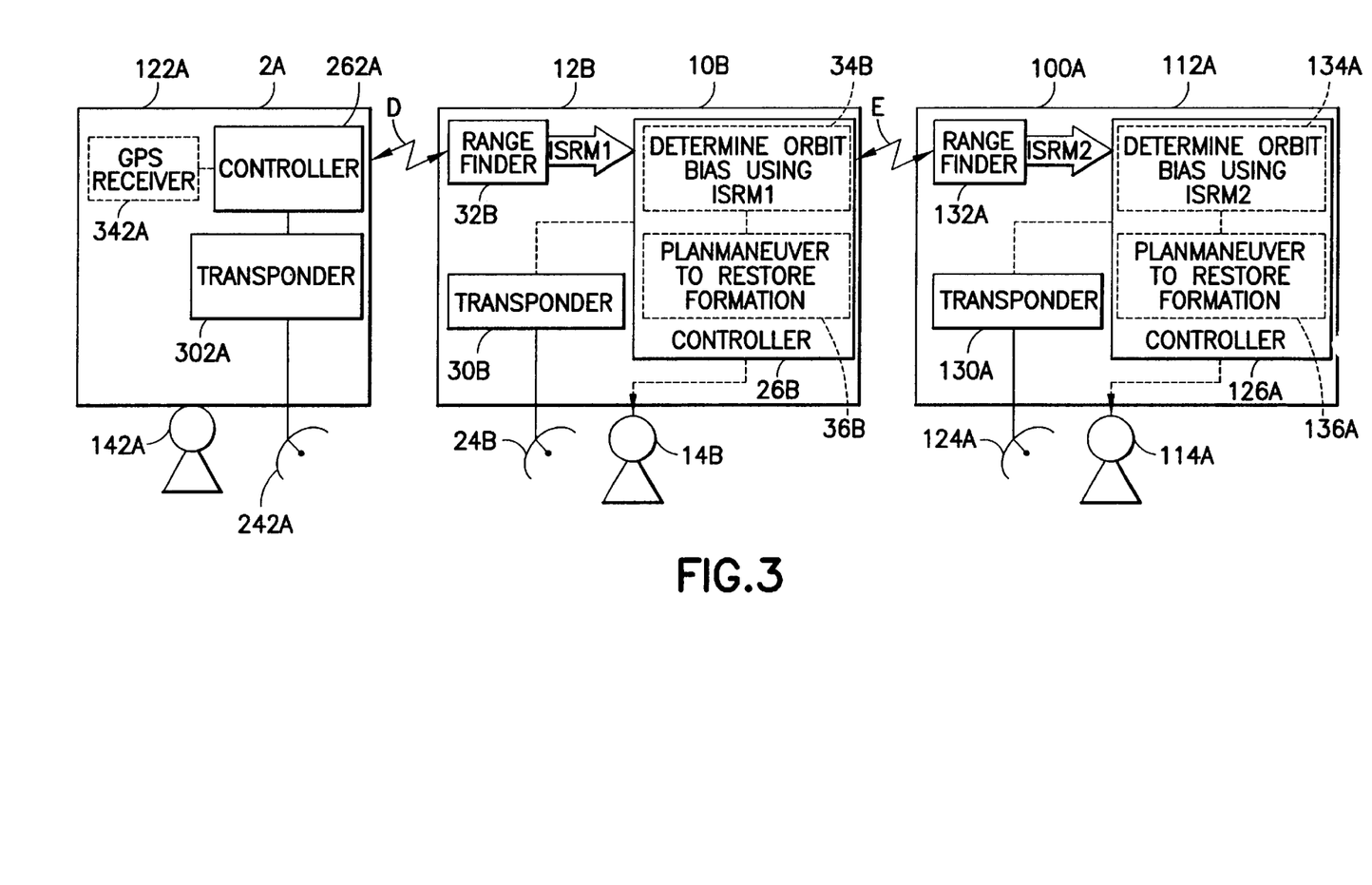
FIG. 3 is a schematic view showing a system for a high precision spacecraft formation keeping used with the constellation of spacecraft in FIG. 1.

Referring now also to FIG. 3, there is shown a schematic view of a master spacecraft 2A, a secondary spacecraft 10B, and a first order tertiary spacecraft 100A of the spacecraft constellation 1. As noted previously, the master, secondary, and tertiary spacecraft 2A, 10B, 100A are substantially similar, except as otherwise noted. Similar features on the master, secondary, and tertiary spacecraft have similar reference numbers. As shown in FIGS. 2 and 3, the secondary, and tertiary spacecraft 10, 10B, 100A in constellation 1 comprise a range finder 32, 32B, 132A which is mounted on the bus 12, 12B, 112A. The range finder 32, 32B, 132A preferably includes radio frequency ranging means capable of accurately measuring the inter-spacecraft range (ISR) from the ranging spacecraft to a target (i.e. the benchmark) spacecraft. Information describing the orbit bias condition of the benchmark spacecraft may also be carried via this link. In alternate embodiments, any other suitable ranging means may be used, such as for example, a laser range finder or electro-optical means. The range finder may be mounted on gimbaled supports which allow the controller 26 to generally point at an antenna (not shown) of the radio frequency ranging means toward its target. The antenna of the range finder 32, 32B, 132A, preferably, has a wide field of view, and the range finder does not provide azimuth or elevation data thereby avoiding having to precisely point the range finder towards the target. After the controller 26, 26B, 126A points the range finder towards a designated target, the target may remain in the field of view of the range finder throughout an orbit of the spacecraft without repositioning the range finder. The range finder 32, 32B, 132A which is operated by the controller 26, 26B, 126A, sends a suitable signal to the controller indicating the measured range or inter-spacecraft range measurement (ISRM) to the controller (see FIG. 3). As seen in FIG. 3, the master spacecraft 2A preferably includes GPS receivers 342A which receive position determining signals from a GPS system. The master spacecraft 2A of constellation 1, may not be provided with a range finder. The position determining signals received by the GPS receivers on the master spacecraft 2A may be sent to the controller 262A onboard the master spacecraft 2A, and then transmitted via communication system 242A to a ground station (not shown) for orbit determination by the ground station. In alternate embodiments, orbit determination for the master spacecraft may be performed using ground based measurements without using GPS receivers. The communication system 242A, 24B, 124A of the master, secondary, and first order tertiary spacecraft in constellation 1 may include a transponder 302A, 30B, 130A programmed to transmit a signal in response to detecting an appropriate incoming signal. By way of example, the transponder 302A, 30B, 130A may be programmed by the spacecraft controller 262A, 26B, 126A to transmit a signal indicating the orbit bias of the spacecraft when the transponder detects an incoming ranging signal from a range finder 32B, 132A of another spacecraft in constellation 1.

As noted above, in the preferred embodiment, orbit determination for the master spacecraft 2, 2A in constellation 1, is performed by ground stations based on the position signals from the spacecraft and/or ground based measurements. In an alternate embodiment, orbit determination may be performed on board the spacecraft using an onboard computer. The orbit solution is compared at the ground stations to the nominal orbit for the corresponding master spacecraft 2, 2A to identify any bias in orbit parameters (e.g. bias in eccentricity e, inclination, RAAN$\Omega$, the argument of perigee (ARGP), or argument of latitude (ARGL)) of the master spacecraft 2, 2A. In alternate embodiments, this comparison may be performed on board the spacecraft. If any orbit bias is identified, the ground stations formulate an appropriate correction maneuver and send the instructions to the controller 262A to execute the correction maneuver with the spacecraft maneuvering system 142A. Alternatively, corrective maneuvers may be planned and executed from computers on board the spacecraft. Preferably, the orbit determination and any correction maneuvers are performed substantially in real time (i.e with little or not time lag from the time of receiving the GPS position of the spacecraft 2A), and hence, the master spacecraft 2, 2A of constellation 1 are substantially always maintained in their nominal orbits.

In the case there is some time lag between orbit determination execution of the correction maneuver (as may caused at times due to operational constraints), the ground stations may instruct the controller 262A to program the transponder 302A to transmit the signal indicating the orbit bias, if any, of the corresponding master spacecraft 2A in response to detecting the ranging signal from dependent secondary spacecraft 10B.

Still referring to FIG. 3, the controller 12B of the secondary spacecraft 10B preferably includes program 34B and program 36B. Program 34B includes instructions allowing the controller 26B on the secondary spacecraft 10B to operate the range finder 32B to obtain the ISRM 1 to the benchmark master spacecraft 2A within continuous line-of-sight (indicated by arrow D). In accordance with program 34B, controller 26B also obtains orbit bias information of the benchmark spacecraft 2A. The orbit bias information may be transmitted by the controller 262A to the secondary spacecraft. Program 34B further includes instructions and appropriate algorithms or data (as will be described below) allowing the controller 26B to use the ISRM 1 from the range finder 32B and the orbit bias information of spacecraft 2A to determine the orbital solution and orbit bias of the spacecraft 10B. Program 36B enables the controller 26B to generate the appropriate maneuver instructions for maneuvering system 14B to correct any orbit bias identified using program 34B. Similarly, as shown in FIG. 3, the controller 126A of the tertiary spacecraft 100A similarly may include programs 134A, and 136A, which are used respectively for determining the orbit bias of the first order tertiary spacecraft using the orbit bias of the secondary spacecraft 10B, and ISRM 2 to the benchmark secondary spacecraft 10B (indicated by arrow E), and for generating the correction maneuver to eliminate this newly computed bias. In alternate embodiments, the controllers on board the secondary and tertiary spacecraft may have any suitable programs for determining orbit solutions using the ISRM and for generating the corrective maneuvers to eliminate the bias.

Figure 4:
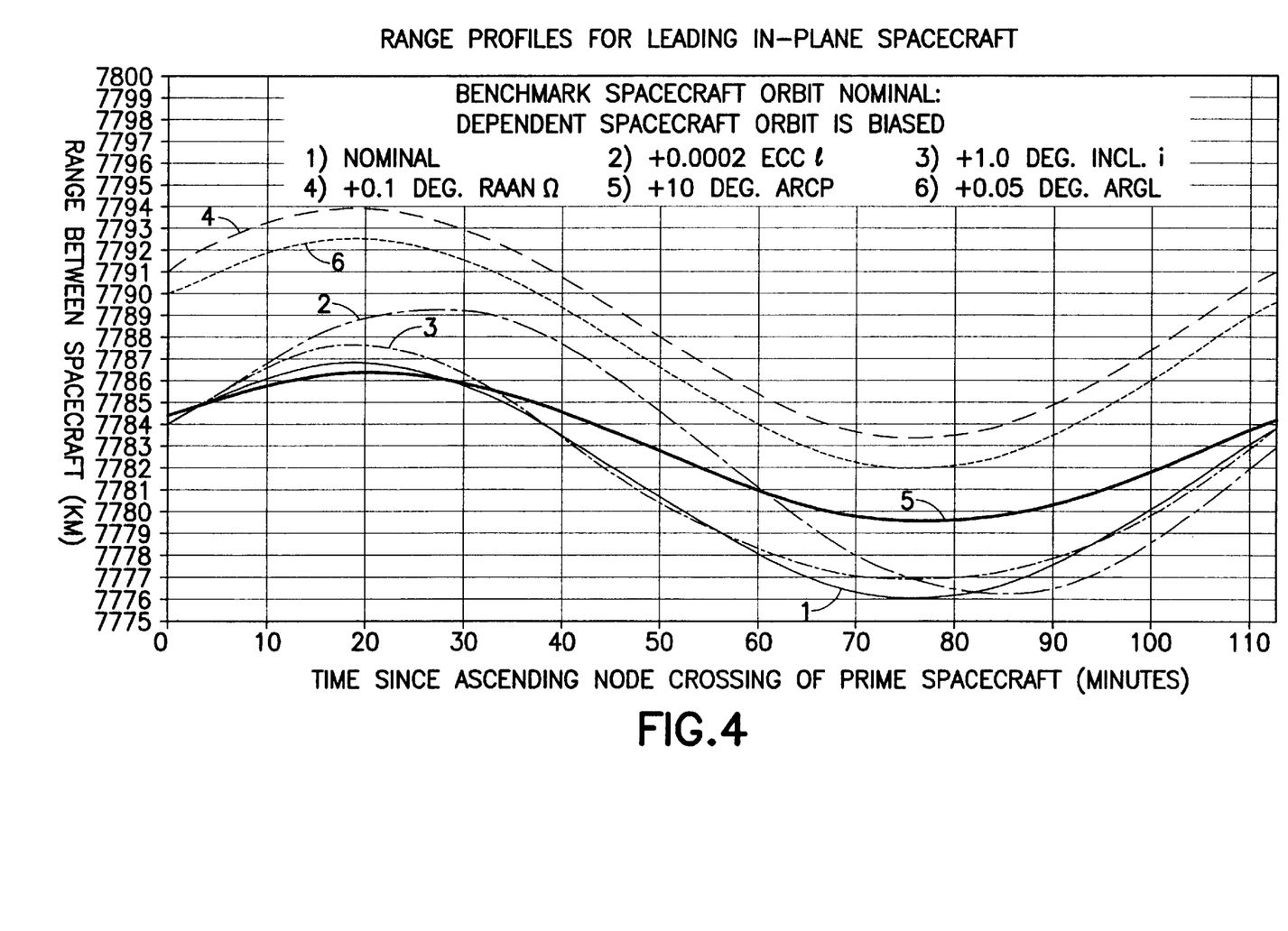
FIGS. 4–4A are graphs respectively depicting the range profile over time between two spacecraft from the constellation of spacecraft in FIG. 1, and variations in the range between the spacecraft over time due to orbital bias of one spacecraft, the two spacecraft having in-plane orbits.
Figure 5:
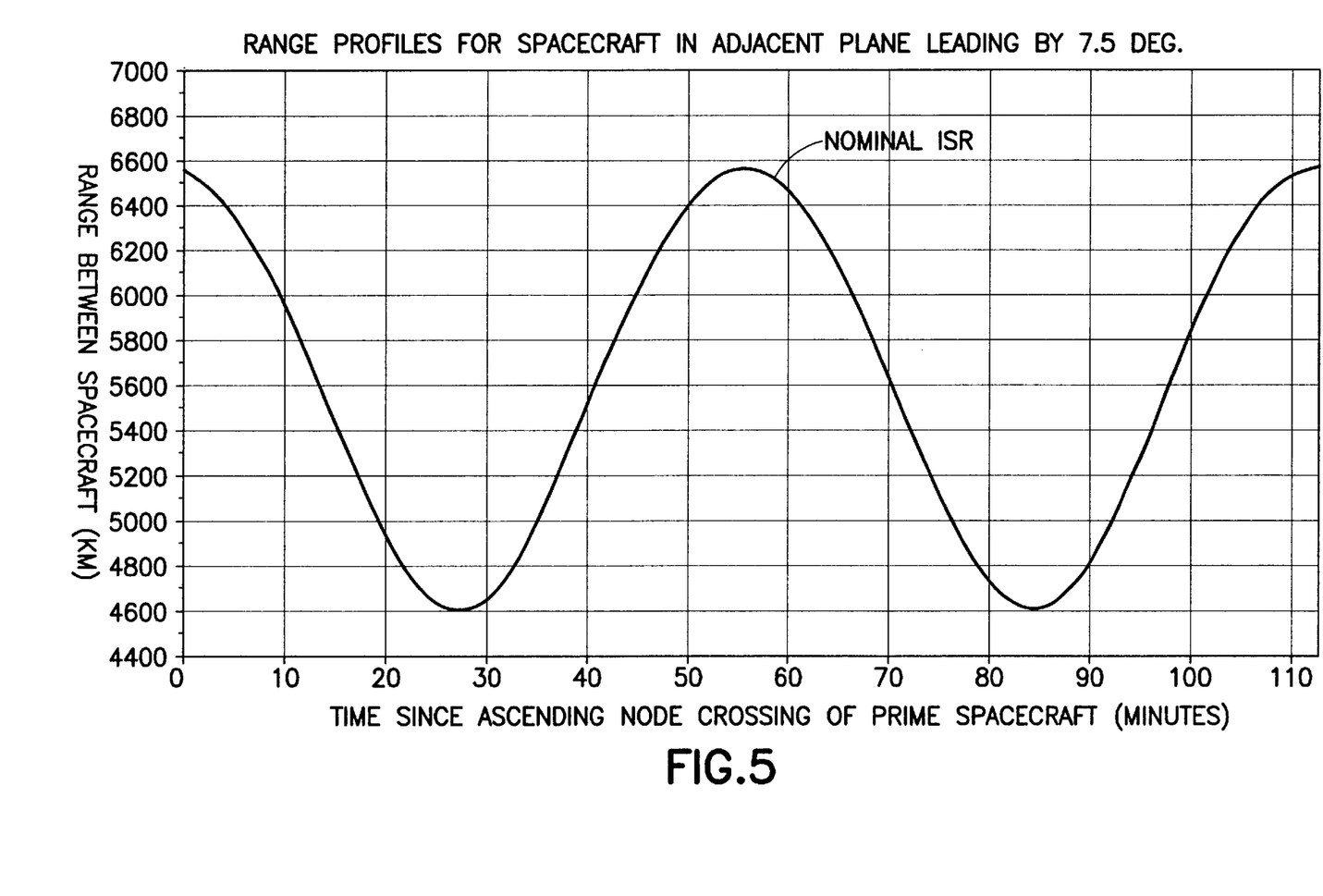
FIGS. 5–5A are graphs respectively depicting the range profile over time between two spacecraft from the constellation of spacecraft in FIG. 1 with orbits in adjacent planes, and variations in the range between spacecraft over time due to orbital bias of one spacecraft.

Referring now to FIG. 5, the graph therein depicts an example of a nominal inter-spacecraft range (ISR) profile during one orbit period. In the case of the profile shown in FIG. 5, the benchmark and dependent spacecraft are in their nominal orbits. The benchmark and dependent spacecraft are in adjacent orbit planes of the Walker constellation 1, and the benchmark spacecraft is leading the dependent spacecraft (similar to the configuration depicted in FIG. 1A) by approximately 7.50. Referring also to FIG. 4, the graph therein portrays an example of a nominal ISR profile for benchmark and dependent spacecraft with orbits in the same plane, with the benchmark spacecraft leading the dependent spacecraft (substantially similar to the relationship between spacecraft 2A, and spacecraft 100A in FIG. 1A). As can be realized from FIGS. 4, 5, the ISR profile over time between benchmark and dependent spacecraft (e.g. benchmark spacecraft 2A and dependent spacecraft 10B, or benchmark spacecraft 10B and dependent spacecraft 100A) is dependent on the orbit planes and orbital positions of the two spacecraft. By way of example, in the adjacent plane case shown in FIG. 5, the amplitude of the variation in range (i.e. about 1000 km) is significantly greater than in the in-plane case shown in FIG. 4 (about 10 km). The range profile between benchmark and dependent spacecraft also varies with bias in the orbit parameters of the dependent spacecraft. FIG. 4, lines 2–6 describe the range profile between in-plane benchmark and dependent spacecraft for different orbit bias (e.g. line 2 corresponds to an increase of 0.0002 bias an eccentricity e, line 3 corresponds to a increase of 10 bias an inclination i, line 4 corresponds to an increase 0.1° bias in RAANΩ, line 5 corresponds to an increase of 10° bias of the ARGP, line 6 corresponds to an increase of 0.05° bias in ARGL). Bias in the orbit parameters of dependent spacecraft in an adjacent plane (e.g. secondary spacecraft 10B, tertiary spacecraft 10A) causes more pronounced and recognizable variations in the ISR to the benchmark spacecraft (e.g. master spacecraft 2A, secondary spacecraft 10B). The program 34B in controller 26B of secondary spacecraft 10B includes suitable electronic algorithms or databases which describe the nominal ISR profile (see for example FIG. 5) corresponding to the secondary spacecraft 10B with respect to master spacecraft 2A. Similarly, in the preferred embodiment, the controller in each secondary, or tertiary spacecraft 10-10B, 100-100A, 200-200B in constellation 1 is programmed with the nominal ISR profile corresponding to the given spacecraft and its respective benchmark spacecraft.

Figure 6:
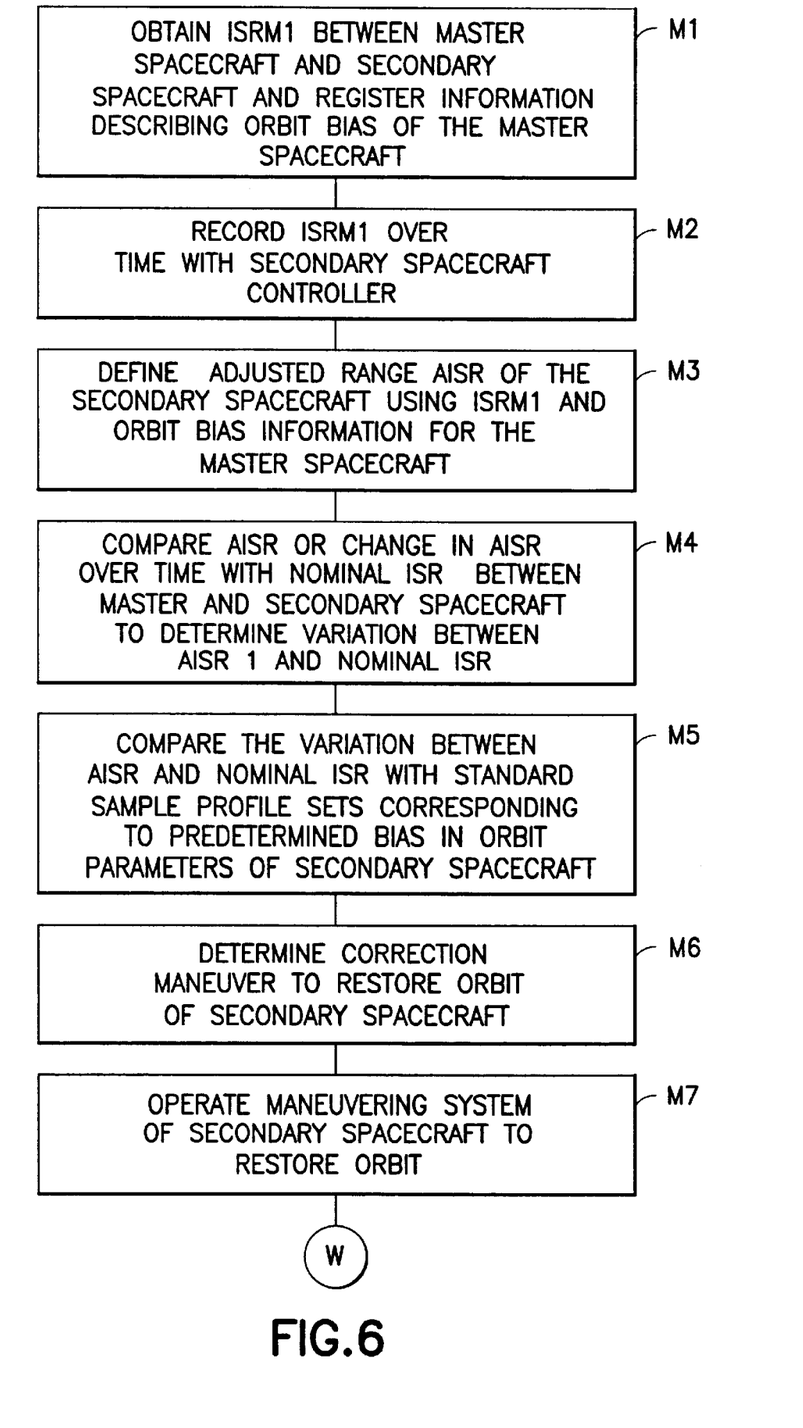
FIG. 6 is a first flow chart graphically depicting a method for keeping formation of spacecraft in the constellation of spacecraft in FIG. 1.

The method for orbit determination, and orbit correction for the secondary spacecraft 10-10B, and tertiary spacecraft 100-100A, 200-200B, in constellation 1 is graphically depicted by the flowchart in FIG. 6 and is generally described below. In block M1 of FIG. 6, the controller 26B, in accordance with its program 34B operates the range finder 32B on secondary spacecraft 10B to obtain the ISRM 1 between the dependent secondary spacecraft 10B and its benchmark master spacecraft 2A. Although the method for providing the orbital solution depicted in the flow chart of FIG. 6 is described below with particular reference to dependent secondary spacecraft 10B and benchmark master spacecraft 2A, this method is applicable to all secondary spacecraft 10 in constellation 1. In the preferred embodiment, the controller operates the range finder to obtain the ISRM 1 between the benchmark independent spacecraft 2A, 10B over a period of time, such as for example, the time period for a complete orbit (e.g. 114 minutes). In alternate embodiments, ISRM 1 may be obtained during any other suitable time period. In block M1 or FIG. 6, the controller 26B further obtains the orbit bias data of the benchmark master spacecraft 2A. The ISRM 1 values and orbit bias data for the master spacecraft may be stored in a suitable memory (not shown) of controller 26B. In block M2, the controller 26B, using appropriate software of program 34B, records in suitable electronic format the ISRM 1 profile or changes in the ISRM 1 relative to time for the period of time during which ISRM 1 data was obtained. Although blocks M2, and M1 are depicted in sequence in FIG. 6, the steps described therein may be performed substantially at the same time. In block M3, the controller 26B uses the orbit bias data for the benchmark master spacecraft, and the ISRM 1 profile to define an adjusted inter-spacecraft range (AISR) profile of the secondary spacecraft 10B with respect to a nominal orbit position of the benchmark master spacecraft. The AISR profile reflects the orbit condition of the secondary spacecraft without the effects of orbit bias of the master spacecraft. In block M4, the electronic AISR profile is compared by controller 26B to the nominal ISR profile (see FIG. 5) of the secondary spacecraft 10B, included in program 34B. The controller 26B determines the variation over time between the AISR profile and the nominal ISR profile. The variation between the nominal AISR profile and the ISRM 1 is due to bias in one or more of the orbit parameters of the secondary spacecraft 10B.

Figure 5A:
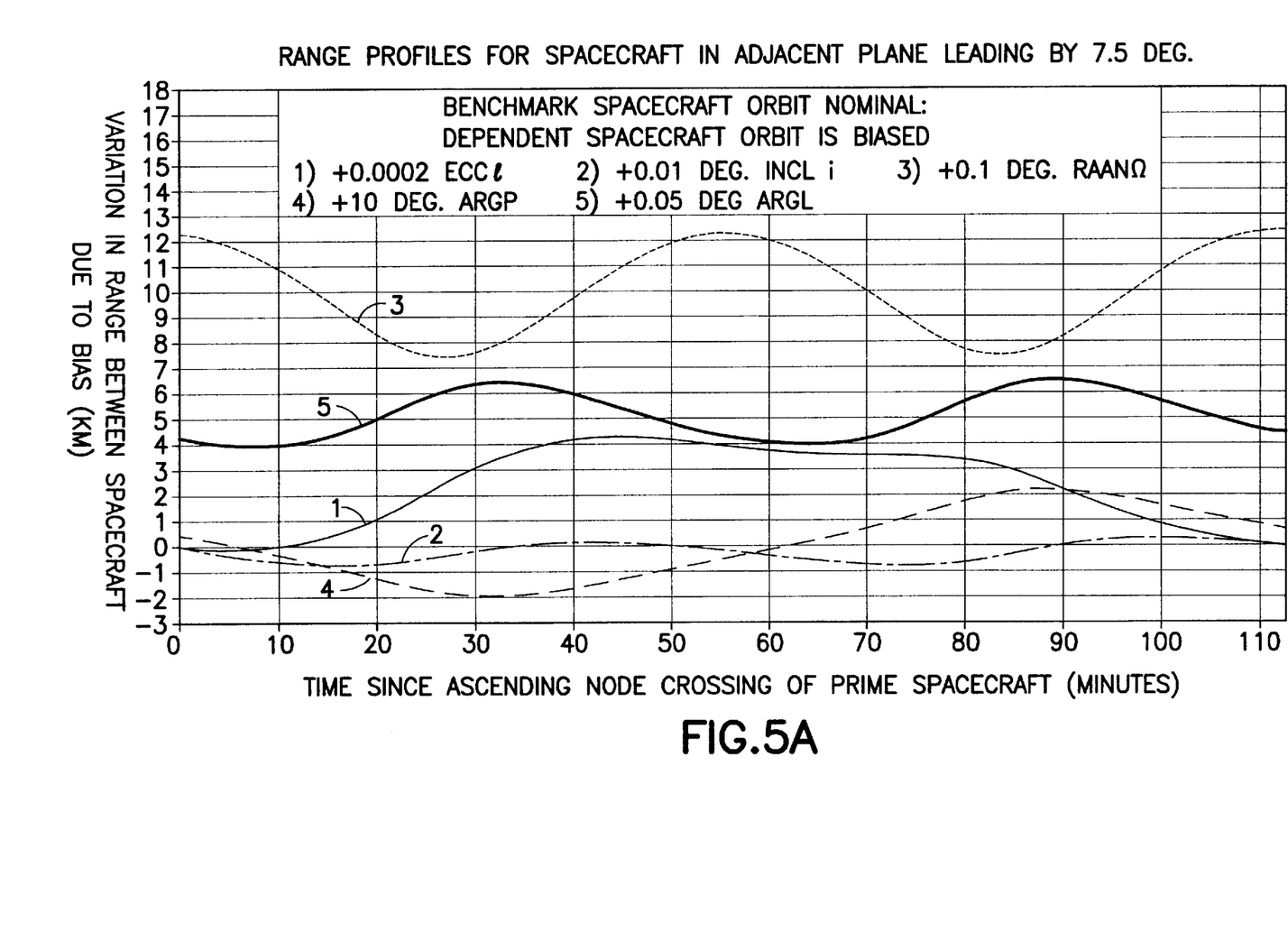

Referring now also to FIG. 5A, the graph shows five example curves 1–5, describing the variation over time between AISR and nominal ISR for the adjacent plane case due to bias in each of the orbit parameters of the secondary spacecraft 10B. As seen in FIG. 5A, the range variation due to bias in each of the five orbit parameters (e.g. line 1 corresponds to an increase of 0.0002 bias in eccentricity e, line 2 correspond to an increase of 0.01° bias in inclination i, line 3 corresponds to an increase of 0.1° bias in RAANΩ, line 4 corresponds to an increase of 10° bias in ARGP, line 5 corresponds to an increase of 0.05° bias in ARGL) is He mathematically distinct and recognizable. By way of example, the variation between AISR and nominal ISR (shown by line 1 of FIG. 5A) due to the increase of 0.0002° bias in orbit eccentricity e has a distinct and recognizable profile over time compared to the variation (lines 2–5) caused by bias in any one of the other orbit parameters. The profiles depicted by lines 1–5 in FIG. 5A are different in both phase and frequency. The program 34B in controller 26B of the secondary spacecraft 10B includes appropriate algorithms, or database tabulations which describe standard sample range variation profiles for a range of predetermined bias in orbital parameters of a secondary spacecraft 10B. By way of example, the program 34B and controller 26B may include a set of sample profiles describing standard inter-spacecraft range variations due to sample bias in orbit eccentricity e from, −0.001, to +0.001 in increments of 0.0001. Similar sets of profiles may be programmed in program 34B of controller 26B to describe standard range variations due to sample bias in the other orbit parameters of secondary spacecraft 10B. Each secondary spacecraft 10 in constellation 1 is programmed with standard sample profile sets corresponding to the given spacecraft. Still referring to FIG. 6, in block M5, the controller 26B in accordance with program 34B compares the variation between AISR and nominal ISR with the standard variation sample sets stored in the controller to find a best fit, and thereby identify a bias in the orbit of the secondary spacecraft 10B. The controller may use two numerical iterative techniques to further define the bias solution. A signal representing the orbit bias of the secondary spacecraft 10B is sent to program 36B in the controller 26B. Program 36B uses the orbit bias signal in a suitable orbital maneuver algorithm of the program to determine a corrective maneuver for the secondary spacecraft 10B to eliminate the identified bias, block M6 of FIG. 6. By way of example, in the case where the variation in AISR to nominal ISR is identified, in step M5, to be caused by orbit bias in the eccentricity e (e.g. for example a +0.0002 bias in e) of the secondary spacecraft 10B, the controller in accordance with program 36B may determine that a corrective retro-directed change in velocity ΔV of an appropriate magnitude may be performed at an orbit perigee (not shown). In the case bias in the inclination i is also identified in block M5, the controller 26B may further determine in block M6 that the change in velocity ΔV be performed, perpendicular to the orbit plane at an equator crossing to restore the orbit inclination of the secondary spacecraft 10B. In block M7, of FIG. 6, the controller sends commands to secondary spacecraft maneuvering system 14B to perform the corrective maneuver determined in block M6. After performing the corrective maneuver, the steps in blocks M1–M7 in FIG. 6 are then repeated thereby maintaining the secondary spacecraft 10B in its nominal orbit. The method for orbit determination for the other secondary spacecraft 10 in constellation 1 is substantially the same as described above and depicted in blocks M1–M7 in FIG. 6.

Figure 7:
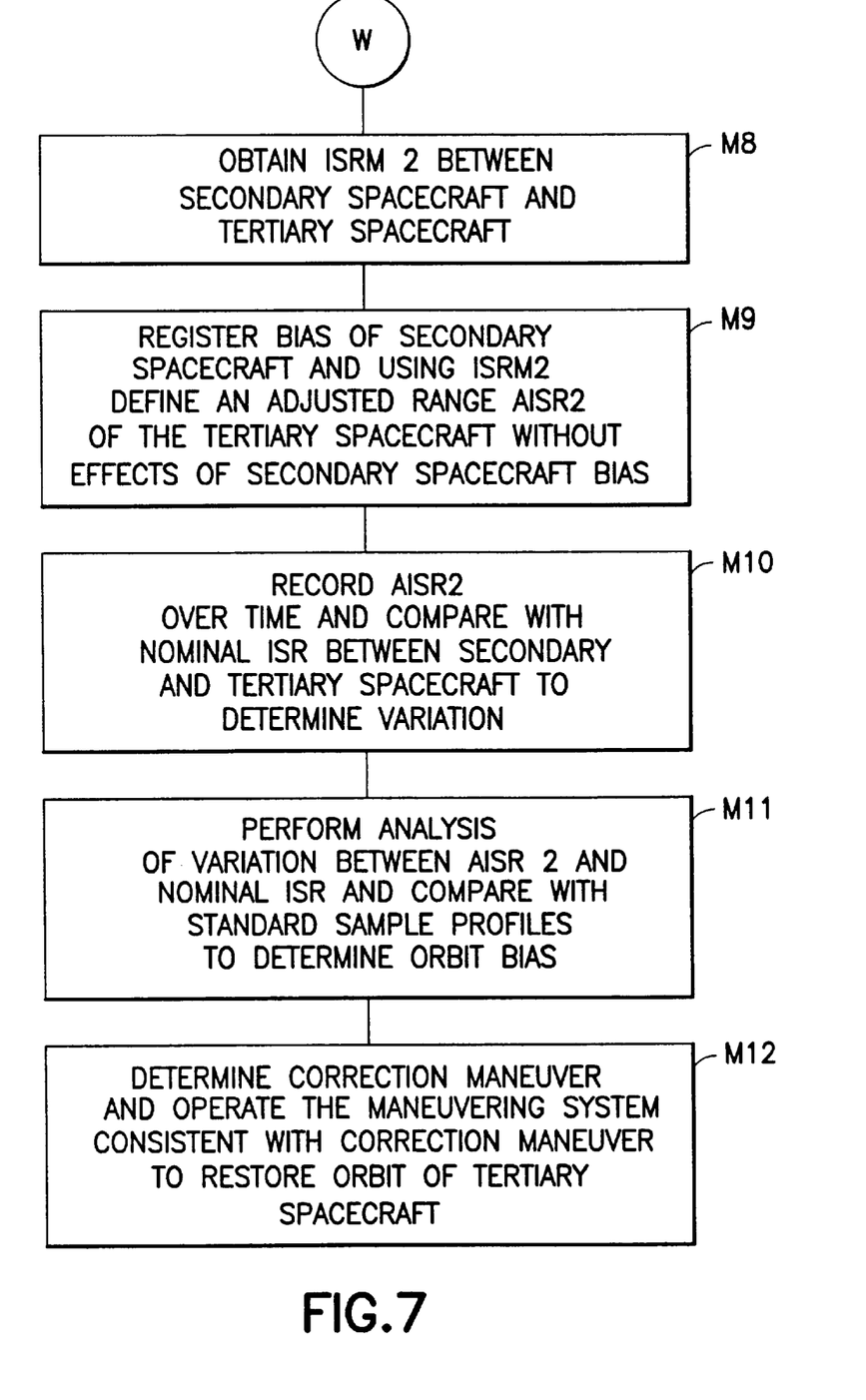
FIG. 7 is a second flow chart graphically depicting a second method for keeping formation of spacecraft in the constellation of spacecraft in FIG. 1.

The method for orbit determination, and orbit correction for the tertiary spacecraft 100A is continued in FIG. 7 from W, in FIG. 6. In block M8, the controller 126A of tertiary spacecraft 100A operates the corresponding range finder 132A in accordance with program 134A to obtain ISRM 2 between benchmark secondary spacecraft 10B and tertiary spacecraft 100A (see FIGS. 1A, 3). As in the case of the secondary spacecraft 10B, the controller 126A continues to obtain the ISRM 2 to its benchmark spacecraft 10B during the time period in which the tertiary spacecraft 100A completes an orbit. The ISRM 2 may be obtained substantially continuously, or at suitable discrete intervals to adequately describe the ISRM 2 profile during the orbit of the tertiary spacecraft 10A. In block M9, the controller 126A registers the bias of the benchmark secondary spacecraft 10B determined according to the steps in blocks M1–M5 in FIG. 6. After determining the orbit bias of the secondary spacecraft 10B, in block M5 of FIG. 6, the controller 26B preferably programs the transponder 30B (see FIG. 3) to transmit via communication system 24B a signal indicating the orbit bias of the secondary spacecraft 10B in response to detecting a ranging signal from the dependent tertiary spacecraft 10A. The orbit bias signal from the secondary spacecraft 10B is received by the communication system 124A of the tertiary spacecraft and routed to the controller 126A. In alternate embodiments, the transponder 30B onboard the secondary spacecraft may transmit the orbit bias signal via spacecraft communication system to one or more ground station which repeat the signal to the tertiary spacecraft. The controller 126A converts the orbit bias signal from the benchmark secondary spacecraft 10B to suitable numerical format. The program 134A has a suitable algorithm which uses the orbit bias of the benchmark secondary spacecraft 10B in combination with the ISRM 2 to define a range profile AISR 2 for the tertiary spacecraft without the effects of benchmark spacecraft bias. The orbit profile AISR 2 over time, or the change in the orbit profile AISR 2 over time, is recorded by the controller 126A in suitable electronic format (e.g. an electronic tabulation which describes the AISR 2 profile), block M10 of FIG. 7. The program 134A numerically compares the recorded orbit profile AISR 2 to the nominal ISR profile stored in controller 126A of tertiary spacecraft 100A. The program 134A determines the range variation between the AISR 2 and nominal ISR profiles due to orbit bias of the tertiary spacecraft 100A. The resulting range variation profile appears similar to one of the curves 1–5 in FIG. 5A, or a combination of two or more of the curves 1–5. In block M11, the program 134A performs an analysis of the range variation profile defined in block M10. As in the case of the controller 26B of the secondary spacecraft 10B, the program 134A in controller 126A of the tertiary spacecraft 100A, preferably includes a set of standard sample range variation profiles for a range of predetermined bias in the orbit parameters (e.g. eccentricity e, inclination i, RAANΩ, ARGP, ARGL) of the tertiary spacecraft 10A. The range variation is compared to the set of standard range variation profiles stored in controller 126A. The program 134A identifies the orbit bias of the first order tertiary spacecraft 100A by finding the sample profile which provides a best fit to the actual range variation profile. The orbit bias is sent to program 136A, which determines a correction maneuver for the tertiary spacecraft 100A to correct its bias, block M12 of the FIG. 7. Appropriate commands are generated by the controller 126A and sent to the maneuvering system 114A to effect the orbit correction maneuver. The steps in blocks M8–M12 of FIG. 7 are repeated to maintain the tertiary spacecraft 100A in orbit. Similarly, the step in blocks M8–M12 of FIG. 7 are performed for each of the first order and second order tertiary spacecraft 100, 200 in constellation 1 to determine and maintain their orbits based upon ISRM to the corresponding benchmark spacecraft.

Figure 4A:
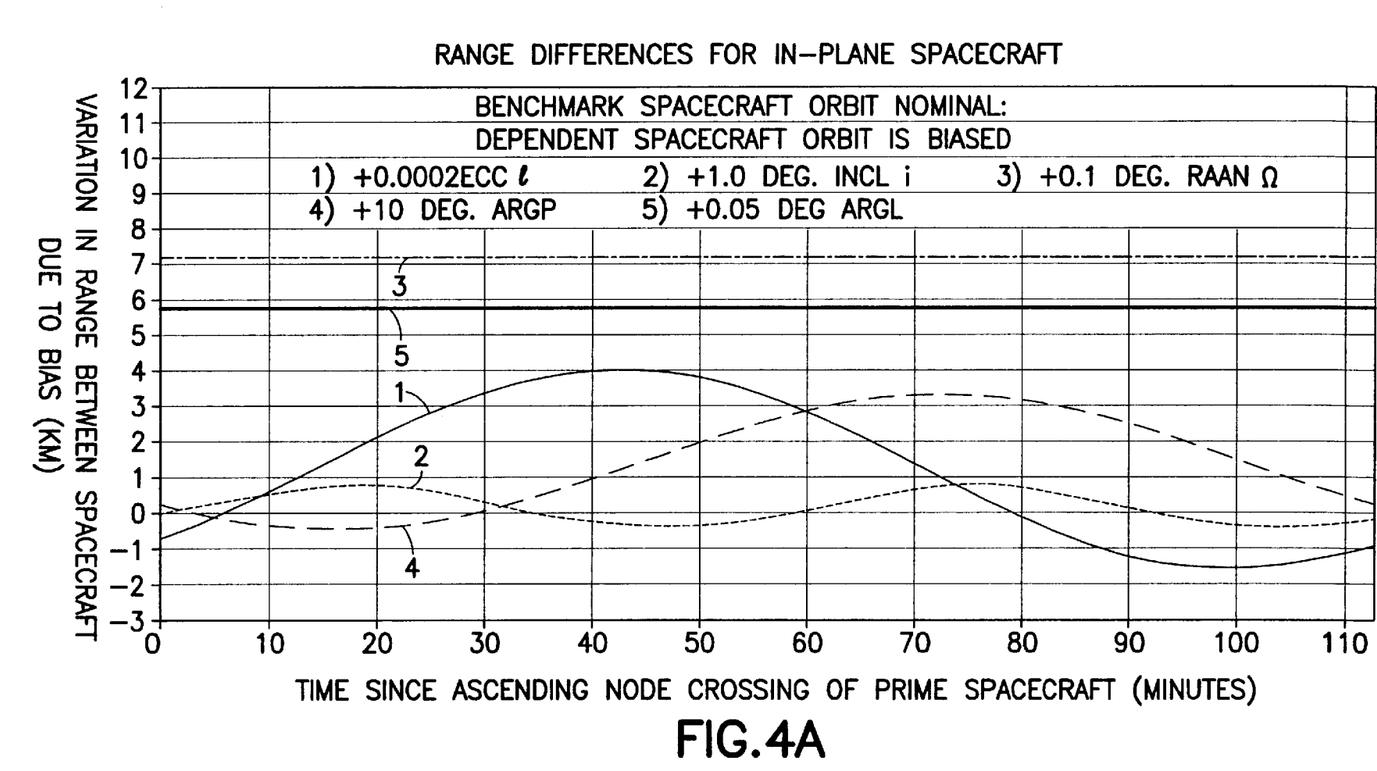

In the preferred embodiment, the tertiary spacecraft 100A may further enhance or supplement the orbit determination by using inter-spacecraft range measurements ISRM to the master spacecraft 2A which is in the same orbit plane as the tertiary spacecraft 10A. As noted before, range measurements between in-plane benchmark and dependent spacecraft (e.g. master and first order tertiary spacecraft 2A, 10A, or secondary and second order tertiary spacecraft 10B, 200B in FIG. 1A) may be used to provide a partial orbit solution. FIGS. 4–4A, are graphs which respectively show curves describing the inter-spacecraft range profile due to various orbit bias, and variations in range relative to nominal range due to noted orbit bias. FIG. 4, shows that the range variation from nominal (i.e. ISRM less the nominal ISR for in plane spacecraft) is distinct and mathematically identifiable for bias in the eccentricity e (line 1), inclination i (line 2), and degree ARGP (line 4). Accordingly, in the case where the tertiary spacecraft 100A is in the same orbit, and in continuous line-of-sight of a master spacecraft 2A, the tertiary spacecraft 100A may, using ISRM to the master spacecraft 2A, enhance or supplement the orbit solution determined using the method in blocks M8–M11 of FIG. 7. The ISRM to the in plane master spacecraft 2A is used in a manner substantially similar to the steps in blocks M8–M11 of FIG. 7, to identify a bias in the eccentricity e, inclination i, or degree ARGP of the tertiary spacecraft 100A. These orbit bias values may be compared to bias values determined in block M11 of FIG. 7 (obtained using ISRM 2 to the out of plane benchmark secondary spacecraft 10B) to aid in eliminating noise in the high precision orbit solution provided using the method described in blocks M8–M11 of FIG. 7.

It should be understood that the foregoing description is only illustrative of the invention. While the present invention has been particularly described with respect to a preferred sequence of process steps in its method claims and certain elements in its preferred embodiment, it will be understood that the invention is not limited to these particular methods and spacecraft constellation described in the preferred embodiments, the process steps, the sequence, or the final structures depicted in the drawings. On the contrary, it is intended to cover all alternatives, modifications, and equivalents as may be included within the spirit and scope of the invention defined by the appended claims. In particular,, the scope of the invention is intended to include, for example, constellations with any number of spacecraft operated in any orbits. In addition, other methods and/or devices may be employed in the spacecraft constellation and its method for operating of the instant invention as claimed with similar results. In alternate embodiments, for example, the ISRM data from range finders on the spacecraft may be transmitted to ground stations. In these cases, the orbit solution may be determined by the ground stations. Thus, various alternatives and modifications can be devised by those skilled in the art without departing from the invention. Accordingly, the present invention is intended to embrace all such alternatives, modifications and variances which fall within the scope of the appended claims.

What is claimed is:

1. A method for controlling a spacecraft comprising the steps of:

provide a first spacecraft in a known first predetermined orbit, and a second spacecraft in a second predetermined orbit;

measuring a distance between the first spacecraft and the second spacecraft;

using the measured distance for determining an orbital error bias of the second spacecraft relative to the second predetermined orbit; and maneuvering the second spacecraft to compensate for the orbital error bias and maintain the second spacecraft in the second predetermined orbit.

2. A method in accordance with claim 1, wherein the first predetermined orbit and the second predetermined orbit are in different orbital planes.

3. A method in accordance with claim 1, wherein the first spacecraft is within line of sight of the second spacecraft for at least part of an orbit.

4. A method in accordance with claim 1, wherein the step of measuring the distance comprises measuring the distance between the first spacecraft and the second spacecraft over time.

5. A method in accordance with claim 1, wherein the step of using the measure distance for determining an orbital error bias comprises finding an error bias in at least one of an eccentricity, an inclination, a right ascension of an ascending node, an argument of periapsis, or argument of latitude of the second spacecraft relative to the second predetermined orbit.

6. A method in accordance with claim 1, wherein the step of using the measured distance comprises using the measured distance and information mathematically describing the known first predetermined orbit of the first spacecraft to define an adjusted distance for the second spacecraft which is decoupled from orbit bias of the first spacecraft, and comparing the adjusted distance to a predetermined distance for finding a variation in the distance between the first and second spacecraft.

7. A method in accordance with claim 6, wherein the step of using the measured distance comprises comparing the found variation in the distance between the first and second spacecraft to a predetermined distance variation due to predetermined bias in at least one of an eccentricity, an inclination, a right ascension of the ascending node, an argument of periapsis, or an argument of latitude of the second spacecraft.

8. A method in accordance with claim 1, wherein the step of measuring the distance comprises transmitting an electromagnetic pulse from the second spacecraft to the first spacecraft, and measuring a predetermined characteristic of a return pulse indicating the distance between the first spacecraft and the second spacecraft.

9. A method in accordance with claim 1, further comprising the step of transmitting electronic information to the second spacecraft, the transmitted information electronically representing an orbit error bias of the first spacecraft.

10. A method for controlling a spacecraft constellation comprising the steps of:

providing a first spacecraft of the spacecraft constellation in a first predetermined orbit, a second spacecraft of the spacecraft constellation in a second orbit, and a third spacecraft of the spacecraft constellation in a third predetermined orbit;

measuring a first distance between the second spacecraft and the first spacecraft, and a second distance between the third spacecraft and the second spacecraft;

using the first measured distance for determining an orbital error bias of the second spacecraft relative to the second predetermined orbit;

using the orbital error bias of the second spacecraft and the second measured distance to define an adjusted second distance decoupled from the orbital error bias of the second spacecraft;

using the adjusted second distance for determining an orbital error bias of the third spacecraft relative to the third predetermined orbit; and maneuvering the third spacecraft to compensate for the orbital error bias of the third spacecraft and maintain the third spacecraft in the third predetermined orbit.

11. A method in accordance with claim 10, wherein at least one of the first orbit, the second orbit, and the third orbit is in a different orbital plane.

12. A method in accordance with claim 10, wherein the first spacecraft is in the line of sight of the second spacecraft, and the second spacecraft is in the line of sight of the third spacecraft.

13. A method in accordance with claim 10, wherein the step of measuring comprises measuring the first distance and the second distance over time.

14. A method in accordance with claim 10, wherein the step of using the first measured distance comprises finding a change in the first measured distance, and comparing the change in the first measured distance to a first predetermined distance change to find a first variation of the change in the first measured distance between the first and second spacecraft, and wherein the step of using the adjusted second distance comprises finding a change in the adjusted second distance, and comparing the change in the adjusted second distance to a second predetermined distance change to find a second variation of the change in the adjusted second distance between the second spacecraft and the third spacecraft.

15. A method in accordance with claim 14, wherein the first variation of the change in the first measured distance is related to an error bias in at least one of an eccentricity, an inclination, a right ascension of an ascending node, an argument of periapsis, or argument of latitude of the second spacecraft relative to the second predetermined orbit, and wherein the second variation in the adjusted second distance is related to an error bias in at least one of an eccentricity, an inclination, a right ascension of an ascending node, an argument of periapsis, or argument of latitude of the third spacecraft relative to the third predetermined orbit.

16. A spacecraft comprising:

a spacecraft bus with a spacecraft maneuvering system mounted thereon;

a range finder connected to the spacecraft bus for measuring a distance between the spacecraft and another spacecraft; and a controller connected to the spacecraft bus, the controller being communicably connected to the range finder for receiving the distance measurement from the range finder;

wherein the controller is programmed for determining an orbital error bias of the spacecraft from the distance measurement, and for operating the maneuvering system in response to the determined orbital error bias.

17. A spacecraft in accordance with claim 16, wherein the range finder measures the distance to the other spacecraft over time.

18. A spacecraft in accordance with claim 17, wherein the controller programming is arranged for comparing the measured distance over time with a predetermined distance to identify a variance in the measured distance, and for relating the variance in the measured distance to the other spacecraft with an error bias in at least one of an eccentricity, an inclination, a right ascension of an ascending node, an argument of periapsis, or argument of latitude of the spacecraft.

19. A spacecraft in accordance with claim 16, further comprising a transmitter connected to the spacecraft bus for transmitting orbit bias information to another spacecraft, and a receiver for receiving orbit bias information from a different other spacecraft.

20. A constellation of spacecraft comprising:

a first spacecraft in a first predetermined orbit; and a second spacecraft in a second predetermined orbit, the second spacecraft orbiting generally in formation with the first spacecraft in the first orbit, wherein the second spacecraft has a range finder for measuring a distance between the second spacecraft and the first spacecraft, and a controller communicably connected to the range finder for receiving the measured distance from the range finder; and wherein the controller has programming for determining an orbital error bias of the second spacecraft from the measured distance, and for operating a maneuvering system of the second spacecraft in response to the determined orbital error bias for maintaining the second spacecraft in the second predetermined orbit generally in formation with the first spacecraft in the first predetermined orbit.

21. A constellation of spacecraft in accordance with claim 20, wherein the first predetermined orbit is in a different orbital plane than the second orbit, and wherein the first spacecraft is in the line of sight of the second spacecraft.

22. A constellation of spacecraft in accordance with claim 20, further comprising a third spacecraft in a third predetermined orbit, the third spacecraft having a range finder for measuring a distance between the third spacecraft and the second spacecraft, and having a controller programmed for determining an orbital error bias of the third spacecraft from the measured distance between the third spacecraft and the second spacecraft, and for operating a maneuvering system of the third spacecraft in response to the determined orbital error bias of the third spacecraft for maintaining the third spacecraft in the third predetermined orbit generally in formation with the first spacecraft and the second spacecraft of the spacecraft constellation.

* * * * *